(12) United States Patent
Shirai et al.

(10) Patent No.: US 10,686,348 B2
(45) Date of Patent: Jun. 16, 2020

(54) ELECTRIC ACTUATOR

(71) Applicant: NIDEC TOSOK CORPORATION, Kanagawa (JP)

(72) Inventors: Hiroshi Shirai, Kanagawa (JP); Toshiaki Nakamura, Kanagawa (JP); Yutaka Uematsu, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 44 days.

(21) Appl. No.: 16/209,971

(22) Filed: Dec. 5, 2018

(65) Prior Publication Data
US 2019/0173356 A1 Jun. 6, 2019

(30) Foreign Application Priority Data

Dec. 6, 2017 (JP) ................. 2017-234309

(51) Int. Cl.
| | |
|---|---|
| *H02K 5/22* | (2006.01) |
| *H02K 11/00* | (2016.01) |
| *H02K 7/11* | (2006.01) |
| *H02K 7/116* | (2006.01) |
| *H02K 11/215* | (2016.01) |
| *F16H 57/02* | (2012.01) |

(52) U.S. Cl.
CPC ............ *H02K 7/116* (2013.01); *F16H 57/02* (2013.01); *H02K 5/225* (2013.01); *H02K 11/215* (2016.01); *F16H 2057/02034* (2013.01)

(58) Field of Classification Search
CPC ...... H02K 7/116; H02K 11/215; H02K 11/33; H02K 5/225; F16H 57/02; F16H 2057/02034

USPC ................................................. 310/71, 68 B
See application file for complete search history.

(56) References Cited

U.S. PATENT DOCUMENTS

| | | | | |
|---|---|---|---|---|
| 5,528,093 A | * | 6/1996 | Adam ................... | H02K 5/225 310/239 |
| 2013/0234548 A1 | * | 9/2013 | Oishi .................... | H02K 5/225 310/71 |

FOREIGN PATENT DOCUMENTS

| | | |
|---|---|---|
| JP | 2001112215 | 4/2001 |
| JP | 2003285665 | 10/2003 |
| JP | 2009065742 | 3/2009 |
| JP | 2016109226 | 6/2016 |

* cited by examiner

*Primary Examiner* — Thomas Truong
(74) *Attorney, Agent, or Firm* — JCIPRNET (57) ABSTRACT

There is provided an electric actuator including a motor, a first case having a first opening, a second case having a second opening that opens to the other side in the axial direction, a rotation sensor, and a plurality of bus bars which are electrically connected to a plurality of sensor terminals that extend from the rotation sensor and are held in the second case. The first and second cases are fixed to each other while the first opening and the second opening face each other in the axial direction, and parts connecting the plurality of bus bars and the plurality of sensor terminals are disposed at positions shifted from each other in a circumferential direction and radially outward from the rotation sensor. Among the plurality of connecting parts, at least one pair of adjacent connecting parts are disposed at positions different from each other in the radial direction.

12 Claims, 4 Drawing Sheets

ELECTRIC ACTUATOR

CROSS-REFERENCE TO RELATED APPLICATION

The present invention claims priority under 35 U.S.C. § 119 to Japanese Application No. 2017-234309 filed on Dec. 6, 2017 the entire content of which is incorporated herein by reference.

BACKGROUND

Technical Field

The disclosure relates to an electric actuator.

Description of Related Art

An electric actuator including two cases fixed to each other is known. For example, in an electric actuator in Japanese Laid-open Publication No. 2016-109226, as two cases, a rear case to which a stator is fixed and a front case to which a decelerator is fixed are provided.

In the electric actuator described above, a sensor and a control board are accommodated on the side of the rear case in which a motor is accommodated. On the other hand, in order to provide a rotation sensor that detects rotation of an output shaft in the front case, since a space not only for the rotation sensor but also for accommodating a member for connection is required, increase in the size of the case is unavoidable.

SUMMARY

The disclosure is to provide an electric actuator.

According to one aspect of the disclosure, there is provided an electric actuator including a motor having a motor shaft that extends in an axial direction; a first case in which the motor is accommodated and which has a first opening that opens to one side in the axial direction; a second case in which a deceleration mechanism connected to the motor is accommodated and which has a second opening that opens to the other side in the axial direction; a rotation sensor which is accommodated in the second case and detects rotation of an output shaft of the deceleration mechanism; and a plurality of bus bars which are electrically connected to a plurality of sensor terminals that extend from the rotation sensor and are held in the second case, wherein the first case and the second case are fixed to each other while the first opening and the second opening face each other in the axial direction, wherein parts connecting the plurality of bus bars and the plurality of sensor terminals are disposed at positions shifted from each other in a circumferential direction and radially outward from the rotation sensor, and wherein, among the plurality of connecting parts, at least one pair of adjacent connecting parts are disposed at positions different from each other in the radial direction.

The above and other elements, features, steps, characteristics and advantages of the disclosure will become more apparent from the following detailed description of the embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE EMBODIMENTS

According to the aspect of the disclosure, there is provided an electric actuator through which increase in a size of a case is reduced and rotation of an output shaft can be detected.

Embodiments of the disclosure will be described below with reference to the drawings.

Here, the scope of the disclosure is not limited to the following embodiments, and any modification can be made within the scope of technical ideas of the disclosure. In addition, in the following drawings, in order to allow respective configurations to be easily understood, actual structures and scales and numbers in the structures may vary.

In the drawings, the Z axis direction is a vertical direction in which the positive side is the upper side and the negative side is the lower side. An axial direction of a central axis J appropriately shown in the drawings is parallel to the Z axis direction, that is, the vertical direction. In the following description, a direction parallel to the axial direction with respect to the central axis J will be simply referred to as an "axial direction Z." In addition, the X axis direction is a first direction X among horizontal directions orthogonal to the axial direction Z. A Y axis direction is a second direction Y among horizontal directions orthogonal to the axial direction Z. The first direction X is orthogonal to the second direction Y.

In addition, a radial direction with respect to the central axis J will be simply referred to as a "radial direction," and a circumferential direction with respect to the central axis J will be simply referred to as a "circumferential direction." In the present embodiment, the upper side corresponds to the other side in the axial direction, and the lower side corresponds to one side in the axial direction. Here, the upper side and the lower side are only names for describing relative positional relationships between respective parts, and actual disposition relationships and the like may be disposition relationships or the like other than disposition relationships indicated by such names.

Figure 1:
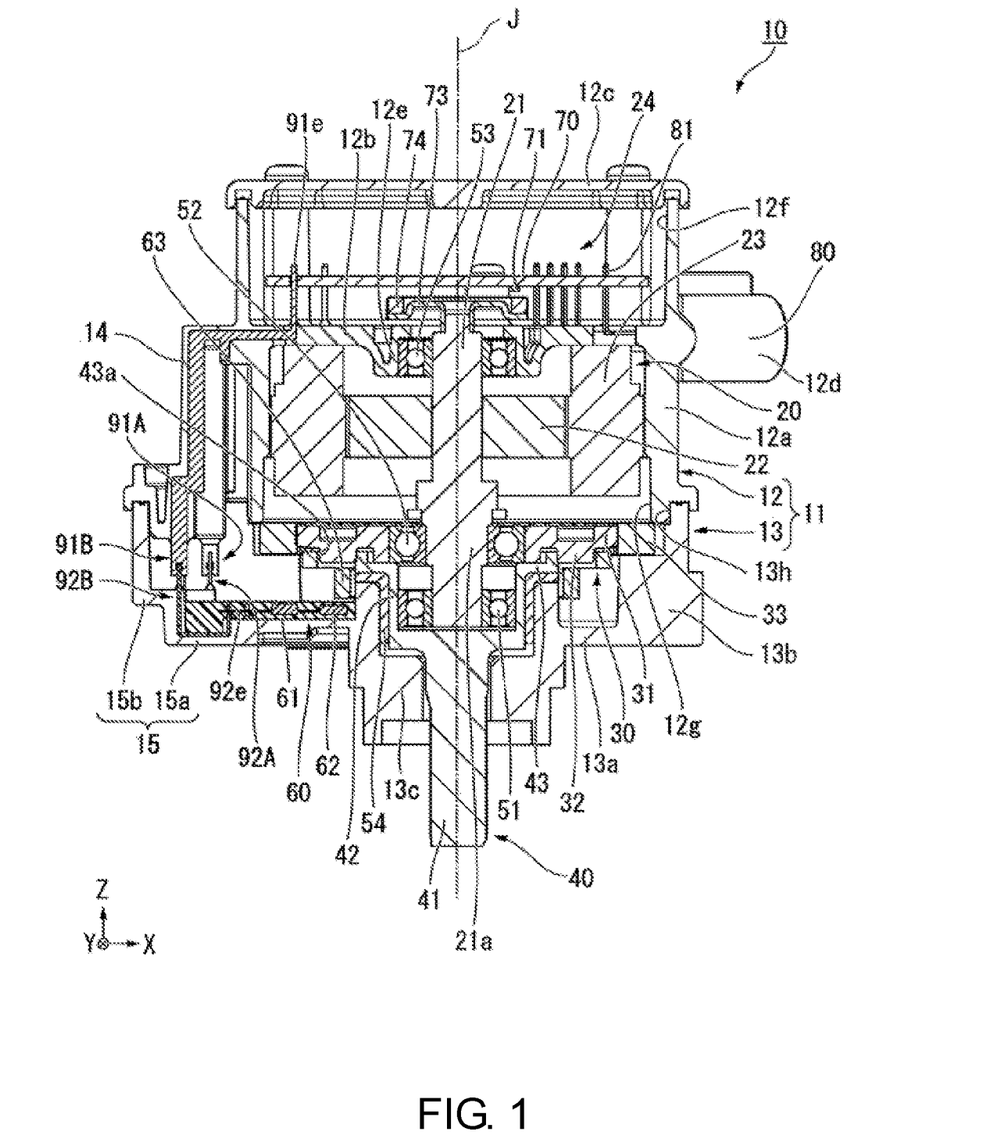
FIG. 1 is a cross-sectional view showing an electric actuator of the present embodiment.
Figure 2:
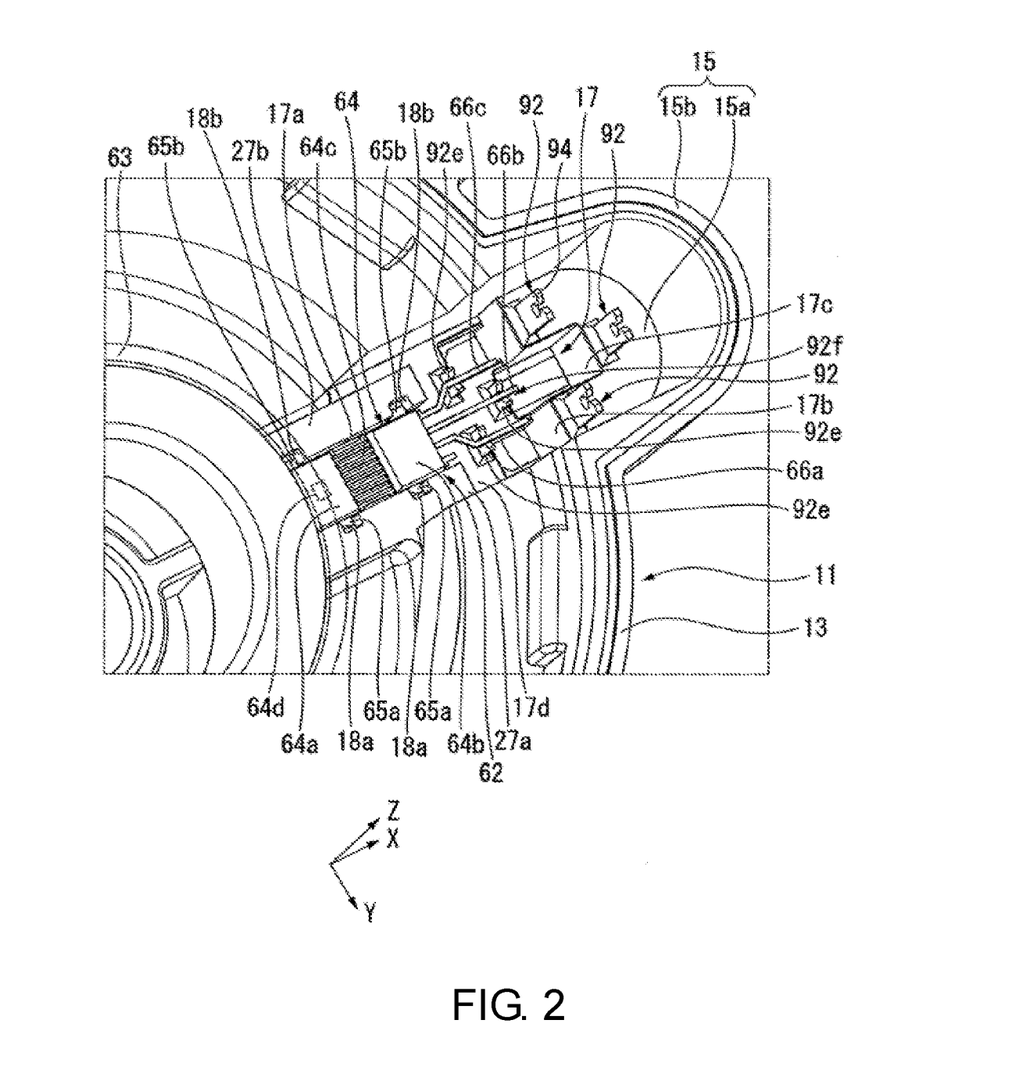
FIG. 2 is a perspective view including a partial cross section of the electric actuator of the present embodiment.

As shown in FIG. 1 and FIG. 2, an electric actuator 10 of the present embodiment includes a case 11, a motor 20 having a motor shaft 21 that extends in an axial direction Z of a central axis J, a control unit 24, a connector part 80, a deceleration mechanism 30, an output part 40, a rotation detection device 60, a first wiring member 91, a second wiring member 92, a first bearing 51, a second bearing 52, a third bearing 53, and a bush 54. The first bearing 51, the second bearing 52, and the third bearing 53 are, for example, a ball bearing. In the present embodiment, the rotation detection device 60 corresponds to an electrical component. The first wiring member 91 and the second wiring member 92 each include a plurality of bus bars.

As shown in FIG. 1, the motor 20 and the deceleration mechanism 30 are accommodated in the case 11. The case 11 includes a motor case 12 in which the motor 20 is accommodated and a deceleration mechanism case 13 in which the deceleration mechanism 30 is accommodated. The motor case 12 corresponds to a first case. The deceleration mechanism case 13 corresponds to a second case. That is, the electric actuator 10 includes the motor case 12 as the first case and the deceleration mechanism case 13 as the second case. The motor case 12 includes a case tube part 12a, an upper lid part 12c, an annular plate part 12b, a bearing holding part 12e, a control board accommodating part 12f, a terminal holding part 12d, and a first wiring holding part 14.

The case tube part 12a has a cylindrical shape that extends in the axial direction Z with respect to the central axis J. The case tube part 12a opens on both sides in the axial direction Z. The case tube part 12a has a first opening 12g that opens to the lower side. That is, the motor case 12 has the first opening 12g. The case tube part 12a surrounds the outside of the motor 20 in the radial direction. The annular plate part 12b has an annular plate shape that extends radially inward from an inner circumferential surface of the case tube part 12a. The annular plate part 12b covers the upper side of a stator 23 (to be described below) of the motor 20. The bearing holding part 12e is provided on the inner edge of the annular plate part 12b in the radial direction. The bearing holding part 12e holds the third bearing 53.

The control board accommodating part 12f is a part in which a control board 70 (to be described below) is accommodated. The control board accommodating part 12f is formed radially inward from an upper part of the case tube part 12a. A bottom surface of the control board accommodating part 12f is an upper surface of the annular plate part 12b. The control board accommodating part 12f opens to the upper side. The upper lid part 12c is a plate-like lid that blocks an upper end opening of the control board accommodating part 12f. The terminal holding part 12d protrudes radially outward from the case tube part 12a. The terminal holding part 12d has a cylindrical shape that opens radially outward. The terminal holding part 12d holds a terminal 81 (to be described below).

The first wiring holding part 14 protrudes radially outward from the case tube part 12a. In FIG. 1, the first wiring holding part 14 protrudes to negative side in the first direction X from the case tube part 12a. The first wiring holding part 14 extends in the axial direction Z. An axial direction position of the upper end of the first wiring holding part 14 is substantially the same as an axial direction position of the annular plate part 12b. A circumferential direction position of the first wiring holding part 14 is different from, for example, a circumferential direction position of the connector part 80.

As shown in FIG. 1, the deceleration mechanism case 13 includes a bottom wall 13a, a tube part 13b, a protruding tube part 13c, and a second wiring holding part 15. The bottom wall 13a has an annular plate shape centered on the central axis J. The bottom wall 13a covers the lower side of the deceleration mechanism 30.

The tube part 13b has a cylindrical shape that protrudes from the outer edge of the bottom wall 13a in the radial direction to the upper side. The tube part 13b opens to the upper side. The upper end of the tube part 13b comes in contact with and is fixed to the lower end of the case tube part 12a. The protruding tube part 13c has a cylindrical shape that protrudes from the inner edge of the bottom wall 13a in the radial direction to both sides in the axial direction. The protruding tube part 13c opens to both sides in the axial direction. The upper end of the protruding tube part 13c is positioned lower than the upper end of the tube part 13b.

The bush 54 having a cylindrical shape that extends in the axial direction Z is disposed inside the protruding tube part 13c. The bush 54 is fitted to the protruding tube part 13c and is fixed into the protruding tube part 13c. The bush 54 has a flange part that protrudes radially outward at its upper end. The flange part of the bush 54 comes in contact with the upper end of the protruding tube part 13c from the upper side. Thereby, the bush 54 is prevented from coming off from the inside of the protruding tube part 13c to the lower side.

The second wiring holding part 15 protrudes radially outward from the tube part 13b. In FIG. 1, the second wiring holding part 15 protrudes from the tube part 13b to the negative side in the first direction X. The second wiring holding part 15 is disposed below the first wiring holding part 14. The second wiring holding part 15 has, for example, a hollow box shape that opens to the upper side. The inside of the second wiring holding part 15 is connected to the inside of the tube part 13b.

The second wiring holding part 15 includes a bottom wall 15a and a side wall 15b. The bottom wall 15a has a plate shape that extends radially outward from the bottom wall 13a. In FIG. 1, the bottom wall 15a extends from the bottom wall 13a to the negative side in the first direction X. The side wall 15b extends from the outer edge of the bottom wall 15a to the upper side.

Figure 3:
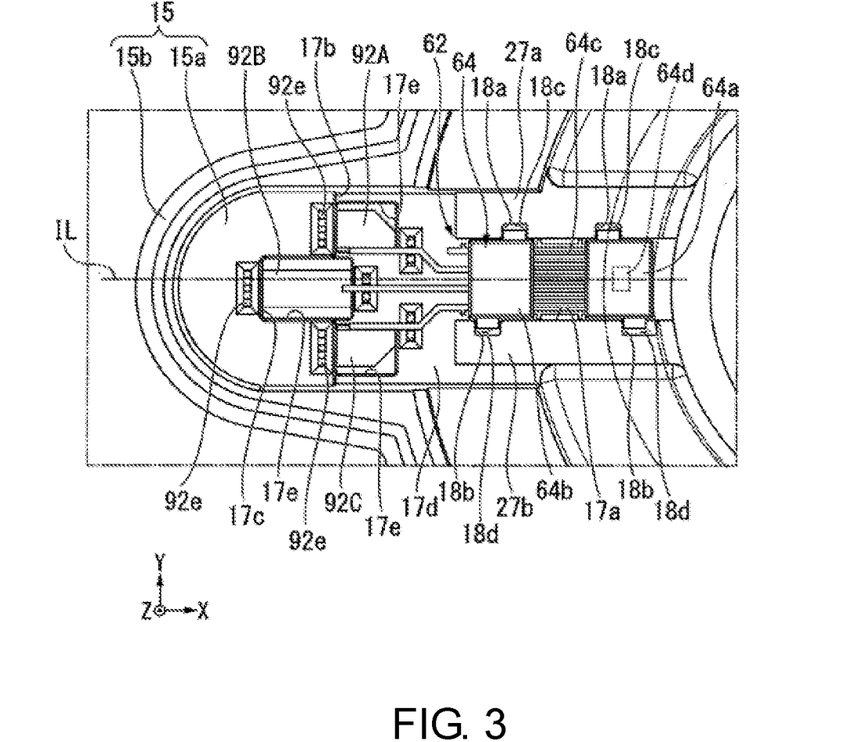
FIG. 3 is a plan view including a partial cross section of the electric actuator of the present embodiment.

As shown in FIG. 2 and FIG. 3, the case 11 has a first recess 17 and second recesses 18a and 18b that are recessed downward from an inner surface of the case 11. The first recess 17 is provided across an upper surface of the bottom wall 13a and an upper surface of the bottom wall 15a. The first recess 17 extends in the radial direction. In the present embodiment, a direction in which the first recess 17 extends is a direction parallel to the first direction X among radial directions. A bottom surface 17d of the first recess 17 is orthogonal to the axial direction Z.

The first recess 17 includes a main body accommodating part 17a, a terminal accommodating part 17b, and an extending part 17c. The main body accommodating part 17a is one side end of the first recess 17 in the first direction X. The main body accommodating part 17a is provided on an upper surface of the bottom wall 13a. A sensor main body 64 (to be described below) is accommodated in the main body accommodating part 17a. The inner edge of the main body accommodating part 17a has a rectangular shape when viewed from the upper side.

The terminal accommodating part 17b is connected to the outer side end of the main body accommodating part 17a in the radial direction. The terminal accommodating part 17b is provided across an upper surface of the bottom wall 13a and an upper surface of the bottom wall 15a. The inner edge of the terminal accommodating part 17b has a rectangular shape when viewed from the upper side. A length of the terminal accommodating part 17b in the second direction Y is larger than a length of the main body accommodating part 17a in the second direction Y.

The extending part 17c is connected to the outer side end of the terminal accommodating part 17b in the radial direction. The extending part 17c further extends radially outward from the inner surface positioned at the outer side end of the terminal accommodating part 17b in the radial direction. The extending part 17c is positioned at the outer side end of the first recess 17 in the radial direction. The extending part 17c is provided on an upper surface of the bottom wall 15a. The inner edge of the extending part 17c has a rectangular shape when viewed from the upper side. A length of the extending part 17c in the second direction Y is smaller than a length of the main body accommodating part 17a in the second direction Y and a length of the terminal accommodating part 17b in the second direction Y.

A plurality of recesses 17e that are recessed downward in the axial direction Z are provided on the bottom surface 17d of the first recess 17. A total of three recesses 17e are provided; two recesses on a bottom surface of the terminal accommodating part 17b within the bottom surface 17d and one recess on a bottom surface of the extending part 17c within the bottom surface 17d. The second wiring member 92 is disposed to cross the recess 17e in the radial direction. Before a resin part 61 (to be described below) is provided, a part of the second wiring member 92 is exposed into the recess 17e.

The insides of the second recesses 18a and 18b are connected to the insides of the first recess 17. More specifically, the insides of the second recesses 18a and 18b are connected to the inside of the main body accommodating part 17a. The second recess 18a opens to an inner surface of one wall 27a between walls 27a and 27b defining the main body accommodating part 17a. The second recess 18b opens to an inner surface of the other wall 27b.

The bottom surface of the second recess 18a is a support surface 18c. The bottom surface of the second recess 18b is a support surface 18d. That is, the case 11 includes the support surfaces 18c and 18d. The support surfaces 18c and 18d face upward and are disposed above the bottom surface 17d of the first recess 17.

Two second recesses 18a are provided apart from each other in the first direction X. Two second recesses 18b are provided apart from each other in the first direction X. An interval between the two second recesses 18a in the first direction X is smaller than an interval between the two second recesses 18b in the first direction X. In the first direction X, a position of the second recess 18a is different from a position of the second recess 18b. Thereby, in the first direction X, a position of the support surface 18c is different from a position of the support surface 18d.

More specifically, between the two second recesses 18b, the second recess 18b positioned radially outward and the support surface 18d thereof are positioned radially outward from the two second recesses 18a and the support surface 18c thereof. In addition, between the two second recesses 18b, the second recess 18b positioned radially inward and the support surface 18d thereof are positioned radially inward from the two second recesses 18a and the support surface 18c thereof.

As shown in FIG. 1, the motor case 12 and the deceleration mechanism case 13 are fixed to each other while the first opening 12g and the second opening 13h face each other in the axial direction Z. In the present embodiment, a lower side end of the motor case 12 includes a lower side end of the case tube part 12a and a lower side end of the first wiring holding part 14. In the present embodiment, an upper side end of the deceleration mechanism case 13 includes an upper side end of the tube part 13b and an upper side end of the second wiring holding part 15. While the motor case 12 and the deceleration mechanism case 13 are fixed to each other, the inside of the first opening 12g and the inside of the second opening 13h are connected to each other.

The motor 20 includes the motor shaft 21, a rotor 22, and the stator 23. The motor shaft 21 is supported by the first bearing 51, the second bearing 52, and the third bearing 53 and is rotatable with respect to the central axis J. An upper end of the motor shaft 21 passes through the bearing holding part 12e in the axial direction Z, and protrudes to the upper side from the annular plate part 12b. Although not shown, an eccentric shaft part 21a which is a part of the motor shaft 21 supported by the second bearing 52 extends with respect to the eccentric shaft that is parallel to the central axis J and eccentric with respect to the central axis J.

The rotor 22 includes a cylindrical rotor core that is fixed to an outer circumferential surface of the motor shaft 21 and a magnet that is fixed to an outer circumferential surface of the rotor core. The stator 23 includes an annular stator core that surrounds the outside of the rotor 22 in the radial direction and a plurality of coils mounted on the stator core. The stator 23 is fixed to an inner circumferential surface of the case tube part 12a. Thereby, the motor 20 is held by the motor case 12.

The control unit 24 includes the control board 70, a second attachment member 73, a second magnet 74, and a second rotation sensor 71. That is, the electric actuator 10 includes the control board 70, the second attachment member 73, the second magnet 74, and the second rotation sensor 71.

The control board 70 has a plate shape that extends in a plane orthogonal to the axial direction Z. The control board 70 is accommodated in the motor case 12. More specifically, the control board 70 is accommodated in the control board accommodating part 12f and is disposed upward and away from the annular plate part 12b. The control board 70 is a board that is electrically connected to the motor 20. A coil of the stator 23 is electrically connected to the control board 70. The control board 70 controls, for example, a current supplied to the motor 20. That is, for example, an inverter circuit is mounted on the control board 70.

The second attachment member 73 has an annular shape centered on the central axis J. An inner circumferential surface of the second attachment member 73 is fixed to an outer circumferential surface of an upper end of the motor shaft 21. The second attachment member 73 is disposed above the third bearing 53 and the bearing holding part 12e. The second attachment member 73 is made of, for example, a nonmagnetic material. Here, the second attachment member 73 may be made of a magnetic material.

The second magnet 74 has an annular shape centered on the central axis J. The second magnet 74 is fixed to an upper end surface of the outer edge of the second attachment member 73 in the radial direction. A method of fixing the second magnet 74 to the second attachment member 73 is not particularly limited. For example, an adhesive is used for bonding. The second attachment member 73 and the second magnet 74 rotate together with the motor shaft 21. The second magnet 74 is disposed above the third bearing 53 and the bearing holding part 12e. The second magnet 74 has an N pole and an S pole that are alternately disposed in the circumferential direction. An upper surface of the second magnet 74 is covered with a magnet cover.

The second rotation sensor 71 is a sensor configured to detect rotation of the motor 20. The second rotation sensor 71 is attached to a lower surface of the control board 70. The second rotation sensor 71 faces the second magnet 74 and a magnet cover covering the upper surface of the second magnet 74 via a gap in the axial direction Z. The second rotation sensor 71 detects a magnetic field generated by the second magnet 74. The second rotation sensor 71 is, for example, a Hall element. Although not shown, a plurality of, for example, three second rotation sensors 71 are provided in the circumferential direction. When change in the magnetic field generated by the second magnet 74 that rotates together with the motor shaft 21 is detected using the second rotation sensor 71, rotation of the motor shaft 21 can be detected.

The connector part 80 is a part for connection to an electrical wiring outside the case 11. The connector part 80 is provided in the motor case 12. The connector part 80 includes the terminal holding part 12d and the terminal 81 described above. The terminal 81 is embedded and held in the terminal holding part 12d. One end of the terminal 81 is fixed to the control board 70. The other end of the terminal 81 is exposed to the outside of the case 11 through the inside of the terminal holding part 12d. In the present embodiment, the terminal 81 is, for example, a bus bar.

An external power supply is connected to the connector part 80 through an electrical wiring (not shown). More specifically, an external power supply is attached to the terminal holding part 12d, and an electrical wiring of the external power supply is electrically connected to a part of the terminal 81 that protrudes into the terminal holding part 12d. Thereby, the terminal 81 electrically connects the control board 70 and electrical wiring. Thus, in the present embodiment, power is supplied to a coil of the stator 23 from the external power supply through the terminal 81 and the control board 70.

The deceleration mechanism 30 is disposed outside a lower side part of the motor shaft 21 in the radial direction. The deceleration mechanism 30 is accommodated inside the deceleration mechanism case 13. The deceleration mechanism 30 is disposed between the bottom wall 13a and the motor 20 in the axial direction Z. The deceleration mechanism 30 includes an external gear 31, an internal gear 33, and an annular part 43.

The external gear 31 has a substantially annular plate shape that extends in a plane orthogonal to the axial direction Z with respect to the eccentric shaft of the eccentric shaft part 21a. A gear part is provided on the outer surface of the external gear 31 in the radial direction. The external gear 31 is connected to the motor shaft 21 through the second bearing 52. Thereby, the deceleration mechanism 30 is connected to the motor shaft 21. The external gear 31 is fitted to an outer ring of the second bearing 52 from the outside in the radial direction. Thereby, the second bearing 52 connects the motor shaft 21 and the external gear 31 around the eccentric shaft in a relatively rotatable manner.

The external gear 31 has a plurality of pins 32. The pins 32 have a cylindrical shape that protrudes to the lower side. Although not shown, the plurality of pins 32 are disposed at equal intervals over one circumference in a circumferential direction with respect to the eccentric shaft.

The internal gear 33 is fixed while surrounding the outside of the external gear 31 in the radial direction and, and meshes with the external gear 31. The internal gear 33 has an annular shape centered on the central axis J. The outer edge of the internal gear 33 in the radial direction is disposed on and fixed to a step part that is recessed outward in the radial direction, which is provided on an inner circumferential surface of the tube part 13b. Thereby, the deceleration mechanism 30 is held in the deceleration mechanism case 13. A gear part is provided on the inner circumferential surface of the internal gear 33. The gear part of the internal gear 33 meshes with the gear part of the external gear 31. More specifically, the gear part of the internal gear 33 meshes partially with the gear part of the external gear 31.

The annular part 43 is a part of the output part 40. The annular part 43 is disposed below the external gear 31. The annular part 43 has an annular plate shape that extends in the radial direction with respect to the central axis J. The annular part 43 comes in contact with a flange part of the bush 54 from the upper side. The annular part 43 has a plurality of holes 43a that penetrate the annular part 43 in the axial direction Z. Although not shown, the shape thereof when viewed from the hole 43a in the axial direction Z is a circular shape. The inner diameter of the hole 43a is larger than the outer diameter of the pin 32. The plurality of pins 32 provided in the external gear 31 pass through the plurality of holes 43a. An outer circumferential surface of the pin 32 is inscribed in an inner circumferential surface of the hole 43a. The inner circumferential surface of the hole 43a supports the external gear 31 through the pin 32 in a manner swingable around the central axis J.

The output part 40 is a part that outputs a driving force of the electric actuator 10. The output part 40 includes the annular part 43, a cylindrical part 42, and an output shaft 41. The cylindrical part 42 has a cylindrical shape that extends from the inner edge of the annular part 43 to the lower side. The cylindrical part 42 has a cylindrical shape that includes a bottom part and opens to the upper side. The cylindrical part 42 is fitted to the inside of the bush 54 in the radial direction. The first bearing 51 is fixed to an inner circumferential surface of the cylindrical part 42. Thereby, the first bearing 51 connects the motor shaft 21 and the output part 40 in a relatively rotatable manner. A lower end of the motor shaft 21 is positioned inside the cylindrical part 42. A lower end surface of the motor shaft 21 faces an upper surface of a bottom part of the cylindrical part 42 via a gap.

The output shaft 41 extends in the axial direction Z and is disposed below the motor shaft 21. In the present embodiment, the output shaft 41 has a cylindrical shape centered on the central axis J. The output shaft 41 extends from a bottom part of the cylindrical part 42 to the lower side. The output shaft 41 passes through the inside of the protruding tube part 13c. A lower end of the output shaft 41 protrudes downward from the protruding tube part 13c. Another member to which a driving force of the electric actuator 10 is output is attached to a lower end of the output shaft 41. In the present embodiment, the output part 40 is a single member.

When the motor shaft 21 is rotated around the central axis J, the eccentric shaft part 21a revolves in the circumferential direction with respect to the central axis J. Revolving of the eccentric shaft part 21a is transmitted to the external gear 31 through the second bearing 52, and the external gear 31 swings while a position inscribing an inner circumferential surface of the hole 43a and an outer circumferential surface of the pin 32 changes. Thereby, a position at which the gear part of the external gear 31 meshes with the gear part of the internal gear 33 changes in the circumferential direction. Thus, a rotational force of the motor shaft 21 is transmitted to the internal gear 33 through the external gear 31.

Here, in the present embodiment, since the internal gear 33 is fixed, it does not rotate. Therefore, due to a reaction force for a rotational force transmitted to the internal gear 33, the external gear 31 rotates around the eccentric shaft. In this case, a direction in which the external gear 31 rotates is opposite to a direction in which the motor shaft 21 rotates. Rotation around the eccentric shaft of the external gear 31 is transmitted to the annular part 43 through the hole 43a and the pin 32. Thereby, the output part 40 rotates around the central axis J. In this manner, rotation of the motor shaft 21 is transmitted to the output part 40 through the deceleration mechanism 30.

Rotation of the output part 40 is decelerated with respect to rotation of the motor shaft 21 by the deceleration mechanism 30. Specifically, in the configuration of the deceleration mechanism 30 of the present embodiment, a reduction ratio R of rotation of the output part 40 with respect to rotation of the motor shaft 21 is represented by $R=-(N2-N1)/N2$. The negative sign at the beginning of the formula representing the reduction ratio R indicates that a direction in which the output part 40 to be decelerated rotates is opposite to a direction in which the motor shaft 21 rotates. N1 indicates the number of teeth of the external gear 31 and N2 indicates the number of teeth of the internal gear 33. As an example, when the number of teeth N1 of the external gear 31 is 59 and the number of teeth N2 of the internal gear 33 is 60, the reduction ratio R becomes −1/60.

In this manner, according to the deceleration mechanism 30 of the present embodiment, the reduction ratio R of rotation of the output part 40 with respect to rotation of the motor shaft 21 can become relatively large. Therefore, a rotation torque of the output part 40 can become relatively large.

The rotation detection device 60 detects rotation of the output part 40. At least a part of the rotation detection device 60 is disposed at a position at which it overlaps the cylindrical part 42 in the radial direction. The rotation detection device 60 is accommodated in the deceleration mechanism case 13. The rotation detection device 60 includes a first magnet 63 and a first rotation sensor 62. The first rotation sensor 62 is embedded in the resin part 61. The resin part 61 is disposed to cross an upper surface of the bottom wall 13a and an upper surface of the bottom wall 15a.

The first magnet 63 has a cylindrical shape centered on the central axis J. The first magnet 63 is fixed to a lower surface of the annular part 43. The first magnet 63 is disposed at the upper end of the protruding tube part 13c and radially outward from the cylindrical part 42 and the bush 54, and surrounds the upper end of the protruding tube part 13c, and the cylindrical part 42 and the bush 54.

The first rotation sensor 62 detects rotation of the output part 40. The first rotation sensor 62 is, for example, a Hall element. As shown in FIG. 2, the first rotation sensor 62 includes the sensor main body 64, a first projection 65a and a second projection 65b as projections, and a plurality of sensor terminals 66a, 66b, and 66c. The sensor main body 64 has a substantially rectangular parallelepiped shape that extends in the first direction X and is flat in the axial direction Z. The sensor main body 64 is accommodated in the first recess 17. More specifically, the sensor main body 64 is accommodated in the main body accommodating part 17a. The sensor main body 64 includes a first part 64a, a second part 64b, and a connecting part 64c. The first part 64a has a substantially square shape when viewed from the upper side. The first part 64a includes a sensor chip 64d therein. That is, the sensor main body 64 has the sensor chip 64d.

The sensor chip 64d is disposed below the first magnet 63. The sensor chip 64d detects a magnetic field generated by the first magnet 63. When change in the magnetic field generated by the first magnet 63 that rotates together with the output part 40 is detected using the sensor chip 64d, the first rotation sensor 62 can detect rotation of the output part 40.

The second part 64b is disposed radially outward from the first part 64a. The second part 64b has a substantially square shape when viewed from the upper side. The sensor terminals 66a, 66b, and 66c are held in the second part 64b. The connecting part 64c connects the first part 64a and the second part 64b. The connecting part 64c electrically connects the sensor chip 64d and the sensor terminals 66a, 66b, and 66c.

The first projection 65a and the second projection 65b protrude in the second direction Y orthogonal to the axial direction Z from the sensor main body 64. The first projection 65a protrudes from the sensor main body 64 to one side in the second direction Y. The second projection 65b protrudes from the sensor main body 64 to the other side in the second direction Y. The first projection 65a and the second projection 65b have a plate shape with a plate surface that is orthogonal to the axial direction Z.

The first projection 65a is supported on the support surface 18c from below. The second projection 65b is supported on the support surface 18d from below. Since the support surfaces 18c and 18d are disposed above the bottom surface 17d of the first recess 17, when the projections are supported on the support surfaces 18c and 18d, the sensor main body 64 is disposed upward and away from the bottom surface 17d of the first recess 17. Thereby, the sensor main body 64 is held at a position away from the case 11. Thus, when a coefficient of thermal expansion of the sensor main body 64 is different from a coefficient of thermal expansion of the case 11, even if the sensor main body 64 and the case 11 are thermally deformed, stress is unlikely to be applied to the sensor main body 64. Therefore, distortion or damage on the sensor chip 64d of the sensor main body 64 can be reduced. As a result, decrease in detection accuracy of the first rotation sensor 62 is reduced.

The sensor terminals 66a, 66b, and 66c extend radially outward from the sensor main body 64. The sensor terminals 66a, 66b, and 66c are accommodated in the terminal accommodating part 17b. The sensor terminals 66a, 66b, and 66c are electrically connected to the sensor chip 64d through the connecting part 64c. A plurality of sensor terminals 66a, 66b, and 66c are disposed side by side in the second direction Y. The sensor terminal 66b is disposed between the sensor terminal 66a and the sensor terminal 66c in the second direction Y. The sensor terminal 66b extends linearly in the first direction X. The sensor terminals 66a and 66c each include a first bent part that is bent to the side away from the sensor terminal 66b in the second direction Y toward the outer side of the sensor main body 64 in the radial direction and a second bent part that is bent toward the sensor terminal 66b on the outer side in the radial direction relative to the first bent part. The sensor terminals 66a, 66b, and 66c are connected to a sensor connecting part 92e (to be described below) of the second wiring member 92.

Figure 4:
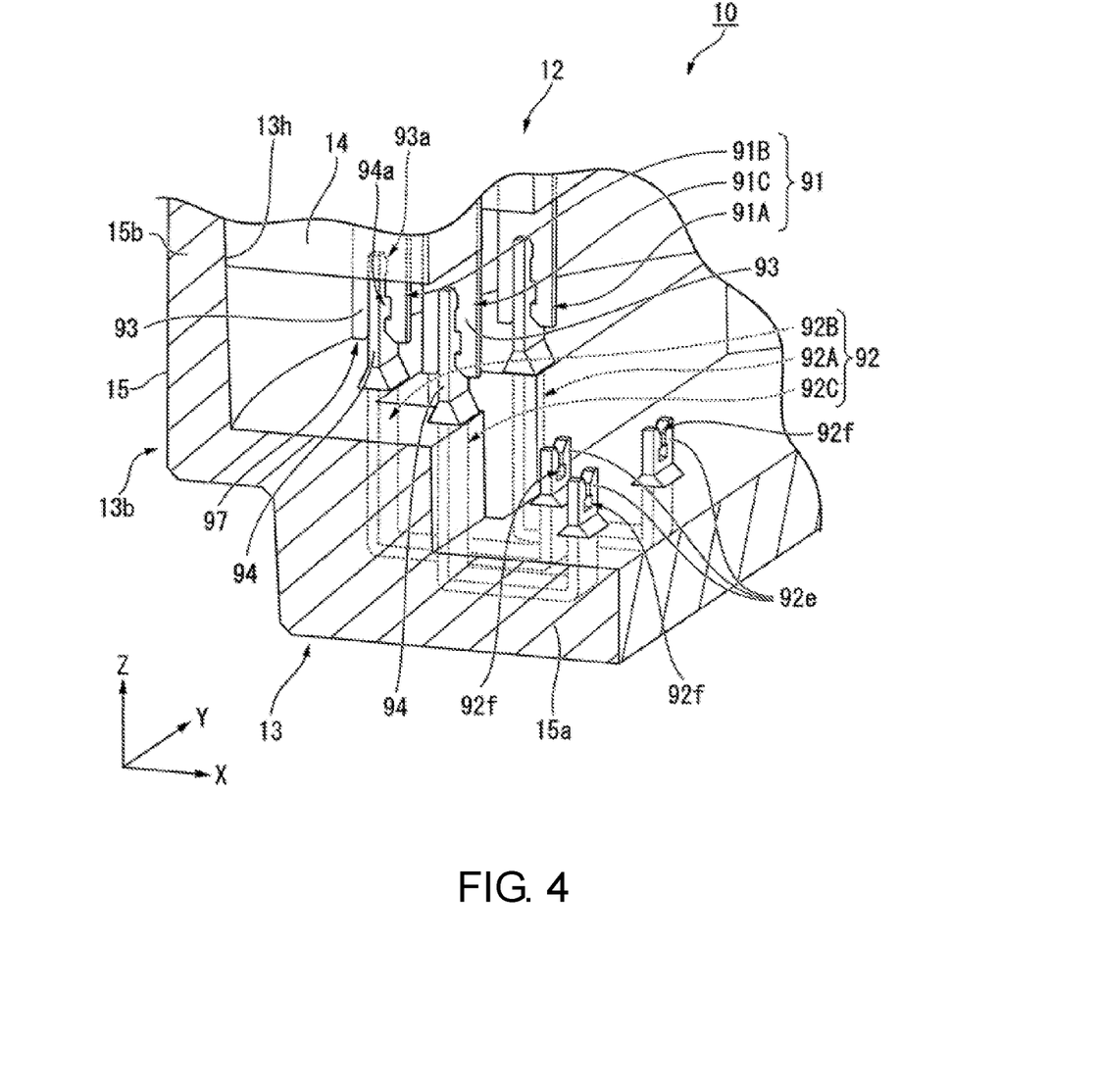
FIG. 4 is a partial cross-sectional perspective view showing a part of the electric actuator of the present embodiment.

The first wiring member 91 and the second wiring member 92 are electrically connected to the rotation detection device 60. In the present embodiment, the first wiring member 91 and the second wiring member 92 are wiring members for connecting the first rotation sensor 62 of the rotation detection device 60 and the control board 70 of the control unit 24. In the present embodiment, as shown in FIG. 4, the first wiring member 91 is composed of three bus bars including first bus bars 91A, 91B, and 91C. In the present embodiment, the second wiring member 92 is composed of three bus bars including second bus bars 92A, 92B, and 92C.

The first bus bars 91A, 91B, and 91C constituting the first wiring member 91 are partially embedded in the first wiring holding part 14. Respective one ends of the first bus bars 91A, 91B, and 91C protrude downward from the first wiring holding part 14 and are exposed into the second wiring holding part 15. One ends of the first bus bars 91A, 91B, and 91C serve as a first connecting part 93 connected to the second bus bars 92A, 92B, and 92C. The other ends of the first bus bars 91A, 91B, and 91C are exposed into the control board accommodating part 12f and are connected to the control board 70.

As shown in FIG. 1 and FIG. 4, the second bus bars 92A, 92B, and 92C are metal members having a U shape in a side view in the circumferential direction. A part of each of the second bus bars 92A, 92B, and 92C is embedded and held in an inner wall of the deceleration mechanism case 13. According to this configuration, since the second bus bars 92A, 92B, and 92C are firmly fixed, the workability and reliability for wiring connection to the second bus bars 92A, 92B, and 92C are improved.

The second bus bars 92A, 92B, and 92C include the sensor connecting part 92e as a connecting part for the first rotation sensor 62 at an end positioned radially inward. The sensor connecting part 92e protrudes upward from the bottom surface 17d of the first recess 17 and is exposed into the first recess 17. The second bus bars 92A, 92B, and 92C include a second connecting part 94 as a connecting part for the first bus bars 91A, 91B, and 91C at an end positioned radially outward.

As shown in FIG. 2, the sensor connecting parts 92e of the second bus bars 92A, 92B, and 92C protrude upward from a bottom surface of the terminal accommodating part 17b. In this manner, when the sensor connecting part 92e is provided in a part of the second bus bars 92A, 92B, and 92C protruding from an inner wall surface of the case 11, a length of the sensor connecting part 92e disposed in the internal space of the case 11 can be reduced to a minimum, and a space in the case 11 can be used efficiently.

Upper ends of the sensor connecting parts 92e are disposed below the upper surface of the bottom wall 13a. As shown in FIG. 1, the sensor connecting part 92e is embedded in the resin part 61.

Upper ends of the sensor connecting parts 92e are branched into two parts by the notch 92f, and the sensor terminals 66a, 66b, and 66c are fitted into a gap of the notch 92f. Thereby, the sensor terminals 66a, 66b, and 66c are connected to the sensor connecting parts 92e in the three second bus bars 92A, 92B, and 92C, and the first rotation sensor 62 and the second wiring member 92 are electrically connected to each other. That is, in the present embodiment, the three sensor connecting parts 92e are parts connecting the plurality of second bus bars 92A, 92B, and 92C and the plurality of sensor terminals 66a, 66b, and 66c. In the present embodiment, since a plate surface of the sensor connecting part 92e is disposed in the circumferential direction, the sensor terminals 66a, 66b, and 66c that extend radially outward from the first rotation sensor 62 can be easily fitted to the notch 92f of the sensor connecting part 92e.

The three sensor connecting parts 92e are disposed at positions shifted from each other in the circumferential direction and radially outward from the first rotation sensor 62. In addition, the sensor connecting part 92e disposed at the center in the circumferential direction among the three sensor connecting parts 92e is disposed radially outward from the sensor connecting parts 92e disposed on both sides in the circumferential direction among the three sensor connecting parts 92e.

According to this configuration, parts connecting the second bus bars 92A, 92B, and 92C and the sensor terminals 66a, 66b, and 66c are disposed shifted in the circumferential direction and the radial direction. Thereby, the plurality of connecting parts can be disposed at narrow intervals. As a result, it is possible to reduce an area in which the connecting parts are disposed, and the first rotation sensor 62 that detects rotation of the output shaft 41 can be accommodated in the case 11 without increasing the size of the case 11.

In the present embodiment, among the three sensor connecting parts 92e, the sensor connecting part 92e positioned at the center in the circumferential direction is disposed at a position away from and radially outward from the first rotation sensor 62 relative to the other two sensor connecting parts 92e. According to this configuration, for example, when the case 11 has a curved shape that protrudes outward such as a cylindrical shape, the three sensor connecting parts 92e can be disposed along a curved surface shape of an inner wall of the case 11. Thereby, an installation space for the sensor connecting part 92e can be reduced.

In addition, in the present embodiment, as shown in FIG. 4, the three second bus bars 92A, 92B, and 92C are bus bars having the same shape. Therefore, among the three second bus bars 92A, 92B, and 92C, the second bus bar 92B positioned at the center in the circumferential direction is disposed at a position away from and radially outward from the first rotation sensor 62 relative to the other two second bus bars 92A and 92C. According to this configuration, for the second connecting part 94 as a connecting part for the first bus bars 91A, 91B, and 91C, an interval between the second connecting parts 94 can be secured and an installation space can be reduced.

As shown in FIG. 3, the sensor terminals 66a, 66b, and 66c are asymmetrically disposed with respect to an imaginary line IL that passes through the center of the sensor main body 64 in the second direction Y. Therefore, for example, when the first rotation sensor 62 is reversed in the second direction Y and disposed, positions of the sensor terminals 66a, 66b, and 66c in the second direction Y change, and connection to each of the sensor connecting parts 92e is not possible. Thereby, it is possible to further minimize disposition of the first rotation sensor 62 in the first recess 17 in an inappropriate direction. Among the three sensor terminals 66a, 66b, and 66c, one sensor terminal is a sensor terminal for signal transmission, one of the other sensor terminals is a sensor terminal for grounding, and the remaining one sensor terminal is a sensor terminal for power supply.

As shown in FIG. 1, the resin part 61 holds the first rotation sensor 62 in the case 11. The resin part 61 is accommodated in the first recess 17. The resin part 61 holds the sensor main body 64 on an inner surface of the first recess 17. The resin part 61 is an elastic component in close contact with the sensor main body 64. Therefore, a difference between an amount of thermal deformation of the first rotation sensor 62 and an amount of thermal deformation of the case 11 according to a difference in coefficients of thermal expansion can be canceled out when the resin part 61 elastically deforms. Thereby, it is possible to further minimize stress applied to the sensor main body 64. Therefore, it is possible to further reduce decrease in detection accuracy of the first rotation sensor 62.

In the present embodiment, the resin part 61 is formed by pouring a resin adhesive into the first recess 17 and curing it. That is, the resin part 61 is an elastic component made of an adhesive. Therefore, the first rotation sensor 62 can be held in the first recess 17 more appropriately by the resin part 61. The resin part 61 covers the entire first rotation sensor 62. The resin part 61 can protect the sensor main body 64 and reduce adhesion of an oil and the like to the sensor main body 64. Here, in FIG. 2 to FIG. 4, the resin part 61 is not shown.

The second connecting parts 94 of the second bus bars 92A, 92B, and 92C protrude upward from an upper surface of the bottom wall 15a. As shown in FIG. 1 and FIG. 4, the second connecting parts 94 of the second bus bars 92A, 92B, and 92C are connected to the first connecting part 93 that protrudes downward from the first wiring holding part 14 within the first wiring member 91. Thereby, the first wiring member 91 and the second wiring member 92 are electrically connected to each other, and the first rotation sensor 62 and the control board 70 are electrically connected through the first wiring member 91 and the second wiring member 92.

As shown in FIG. 4, the first connecting part 93 has a shape in which a tip is branched into two parts by a notch 93a provided at the tip. In addition, the second connecting part 94 has a shape in which a tip is branched into two parts by a notch 94a provided at the tip. The notches 93a and 94a extend in the axial direction from a lower end of the first connecting part 93 and an upper end of the second connecting part 94.

The first bus bar 91A and the second bus bar 92A which are connected to each other are disposed such that their plate surfaces are perpendicular to each other when viewed in the axial direction. The first bus bar 91A and the second bus bar 92A are connected so that the notch 93a of the first connecting part 93 and the notch 94a of the second connecting part 94 are engaged with each other. The second bus bar 92A is press-fitted to the bifurcated part of the first connecting part 93. The first bus bar 91A is press-fitted to the bifurcated part of the second connecting part 94. A connecting part between the first bus bar 91B and the second bus bar 92B and a connecting part between the first bus bar 91C and the second bus bar 92C are the same. According to this configuration, it is possible to prevent the connected first connecting part 93 and second connecting part 94 from being disconnected. Therefore, it is possible to easily and stably connect the first connecting part 93 and the second connecting part 94.

In the present embodiment, a plurality of connection wiring parts 97 formed when the first bus bars 91A, 91B, and 91C and the second bus bars 92A, 92B, and 92C are connected and thus the first connecting part 93 and the second connecting part 94 are connected to each other are provided. At least two connection wiring parts 97 are different from each other in distance from the motor shaft 21. Therefore, a distance between the connection wiring parts 97 formed when the first connecting part 93 and the second connecting part 94 which have plate surfaces crossing each other are connected to each other is easily secured and a space in which the plurality of connection wiring parts 97 are disposed is easily reduced.

Since the first connecting parts 93 and the second connecting parts 94 are disposed as described above, the three connection wiring parts 97 are provided side by side in the second direction Y orthogonal to the axial direction Z when viewed in the radial direction of the motor shaft 21. Thus, the connection wiring part 97 at the center in the second direction Y among the three connection wiring parts 97 is disposed further away from the motor shaft 21 than the other two connection wiring parts 97.

Since the connection wiring parts 97 are disposed as described above, compared to when the three connection wiring parts 97 are arranged in a row in the first direction X or the second direction Y, a sufficient distance between the three connection wiring parts 97 can be secured and the three connection wiring parts 97 can be collectively disposed in a relatively small space. Therefore, it is possible to further reduce increase in the size of the electric actuator 10.

According to the present embodiment, power supply of the rotation detection device 60 can be obtained from power supply of the motor 20 connected to the control board 70, and one external power supply connected to the electric actuator 10 can be provided. Therefore, the configuration of the electric actuator 10 can be simplified. Specifically, in the case of the present embodiment, power supply of the rotation detection device 60 is obtained from an external power supply connected to the control board 70 through the connector part 80, and thus one external power supply connected to the electric actuator 10 can be provided.

The disclosure is not limited to the above embodiment, and other configurations can be used. While a configuration in which three second bus bars are provided has been described, a configuration including two or four or more second bus bars may be provided. When only two second bus bars are provided, sensor connecting parts of two second bus bars are disposed at positions shifted from each other in the circumferential direction and the radial direction. On the other hand, when four or more second bus bars are provided, regarding sensor connecting parts of the second bus bars, if at least two adjacent sensor connecting parts are disposed at positions shifted from each other in the circumferential direction and the radial direction, there is an effect of reducing an installation space for the sensor connecting part. In addition, four or more sensor connecting parts may be disposed in the circumferential direction so that positions thereof in the radial direction are in a zigzag manner. In addition, four or more sensor connecting parts may be disposed so that positions thereof in the radial direction are closer to the motor shaft 21 as they are closer to both ends in the circumferential direction.

The first wiring member may not be connected to the control board. In this case, for example, an end on the side opposite to the first connecting part of the first wiring member may be exposed to the outside of the case through the terminal holding part. Thereby, an electrical wiring of the external power supply connected to the connector part can be directly connected to the first wiring member.

In addition, either one of a part of the first wiring member and a part of the second wiring member may not be embedded in the case or both thereof may not be embedded in the case. In addition, the first wiring member need not be a bus bar. For example, the first wiring member may have a configuration including a plate-like connecting part and a lead wire electrically connected to the connecting part.

In addition, the control board may not be provided. In this case, a terminal held by the terminal holding part is directly electrically connected to a coil of the stator. In addition, the board accommodated in the motor case may not be a control board. In this case, an inverter circuit and the like are provided outside the electric actuator.

In addition, the configuration of the rotation detection device is not particularly limited as long as it can detect rotation of the output part and is accommodated in the deceleration mechanism case. The first rotation sensor is not particularly limited as long as it can detect rotation of the output part, and may be a magnetoresistive element. In addition, similarly, the second rotation sensor may be a magnetoresistive element.

In addition, the configuration of the deceleration mechanism is not particularly limited as long as it can decelerate rotation of the motor shaft. In addition, the first bearing, the second bearing, and the third bearing are not particularly limited as long as they can support the motor shaft, and may be, for example, a sliding bearing.

In addition, applications of the electric actuator of the disclosure are not limited and the electric actuator of the disclosure may be mounted in any device. In addition, the above configurations can be appropriately combined within ranges not contradictory to each other.

Features of the above-described embodiments and the modifications thereof may be combined appropriately as long as no conflict arises.

While embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric actuator comprising:
a motor having a motor shaft that extends in an axial direction;
a first case in which the motor is accommodated and which has a first opening that opens to one side in the axial direction;
a second case in which a deceleration mechanism connected to the motor is accommodated and which has a second opening that opens to the other side in the axial direction;
a rotation sensor which is accommodated in the second case and detects rotation of an output shaft of the deceleration mechanism; and
a plurality of bus bars which are electrically connected to a plurality of sensor terminals that extend from the rotation sensor and are held in the second case,
wherein the first case and the second case are fixed to each other while the first opening and the second opening face each other in the axial direction,
wherein a plurality of connecting parts that connect the plurality of bus bars and the plurality of sensor terminals are disposed at positions shifted from each other in a circumferential direction and radially outward from the rotation sensor, and
wherein, among the plurality of connecting parts, at least one pair of adjacent connecting parts are disposed at positions different from each other in the radial direction.

2. The electric actuator according to claim 1,
wherein the three bus bars and the three sensor terminals are provided, and
wherein, among the three connecting parts that connect the three bus bars and the three sensor terminals, the connecting part positioned at a center in the circumferential direction is disposed at a position away from and radially outward from the rotation sensor relative to the other two connecting parts.

3. The electric actuator according to claim 2,
wherein, among the three bus bars, the bus bar positioned at the center in the circumferential direction is disposed at a position away from and radially outward from the rotation sensor relative to the other two bus bars.

4. The electric actuator according to claim 3,
wherein the plurality of bus bars are partially embedded in an inner wall of the second case, and
wherein one end of the bus bar protrudes from an inner wall surface of the second case into the second case and is connected to the sensor terminal.

5. The electric actuator according to claim 3,
wherein the bus bar is an elongated plate-like metal member and has a notch at one end positioned at the connecting part, and
wherein, in the connecting part, a plate surface of the bus bar is disposed in the circumferential direction, and the sensor terminal is held by the notch.

6. The electric actuator according to claim 2,
wherein the plurality of bus bars are partially embedded in an inner wall of the second case, and
wherein one end of the bus bar protrudes from an inner wall surface of the second case into the second case and is connected to the sensor terminal.

7. The electric actuator according to claim 6,
wherein the bus bar is an elongated plate-like metal member and has a notch at one end positioned at the connecting part, and
wherein, in the connecting part, a plate surface of the bus bar is disposed in the circumferential direction, and the sensor terminal is held by the notch.

8. The electric actuator according to claim 2,
wherein the bus bar is an elongated plate-like metal member and has a notch at one end positioned at the connecting part, and
wherein, in the connecting part, a plate surface of the bus bar is disposed in the circumferential direction, and the sensor terminal is held by the notch.

9. The electric actuator according to claim 1,
wherein the plurality of bus bars are partially embedded in an inner wall of the second case, and
wherein one end of the bus bar protrudes from an inner wall surface of the second case into the second case and is connected to the sensor terminal.

10. The electric actuator according to claim 9,
wherein the other end of the bus bar protrudes from an inner wall surface of the second case, extends to the second opening, and is connected to a wiring member held in the first case.

11. The electric actuator according to claim 9,
wherein the bus bar is an elongated plate-like metal member and has a notch at one end positioned at the connecting part, and
wherein, in the connecting part, a plate surface of the bus bar is disposed in the circumferential direction, and the sensor terminal is held by the notch.

12. The electric actuator according to claim 1,
wherein the bus bar is an elongated plate-like metal member and has a notch at one end positioned at the connecting part, and
wherein, in the connecting part, a plate surface of the bus bar is disposed in the circumferential direction, and the sensor terminal is held by the notch.

* * * * *